United States Patent [19]

Wing et al.

[11] 4,083,783

[45] Apr. 11, 1978

[54] REMOVAL OF HEAVY METAL IONS FROM AQUEOUS SOLUTIONS WITH INSOLUBLE CROSSLINKED-STARCH-XANTHATES

[75] Inventors: Robert E. Wing, Peoria; William M. Doane, Morton, both of Ill.

[73] Assignee: The United States of America as represented by the Secretary of Agriculture, Washington, D.C.

[21] Appl. No.: 803,190

[22] Filed: Jun. 3, 1977

Related U.S. Application Data

[60] Division of Ser. No. 695,617, Jun. 14, 1976, Pat. No. 4,051,316, which is a continuation-in-part of Ser. No. 515,262, Oct. 16, 1974, Pat. No. 3,979,286.

[51] Int. Cl.² ................................................. C02B 1/20
[52] U.S. Cl. ....................................................... 210/54
[58] Field of Search ................... 210/54 R, 38 B, 54 C; 536/104, 107, 106, 108, 109

[56] References Cited

U.S. PATENT DOCUMENTS

| 3,385,719 | 5/1968 | Lancaster et al. | 536/106 |
| 3,947,354 | 3/1976 | Swanson et al. | 210/54 |

OTHER PUBLICATIONS

Wing; R. E., "Heavy Metal Removal from Waste Water with Starch Xanthate", Proceed, 29th Ind. Waste Conf., Purdue Univ., pp. 348–356 (1974).

*Primary Examiner*—Charles N. Hart
*Assistant Examiner*—Benoit Castel
*Attorney, Agent, or Firm*—M. Howard Silverstein; David G. McConnell; Curtis P. Ribando

[57] ABSTRACT

An insoluble alkali metal-magnesium starch-xanthate composition is prepared which is capable of removing most heavy metal ions from aqueous solutions. Concentrations of heavy metal ions obtained in several industrial effluents were reduced to below the most stringent aqueous discharge limits.

6 Claims, 2 Drawing Figures

REMOVAL OF HEAVY METAL IONS FROM AQUEOUS SOLUTIONS WITH INSOLUBLE CROSSLINKED-STARCH-XANTHATES

CROSS-REFERENCES TO RELATED APPLICATIONS

This is a division, of application Ser. No. 695,617 filed June 14, 1976, now U.S. Pat. No. 4,051,316 which is a continuation-in-part of Ser. No. 515,262, filed Oct. 16, 1974, now U.S. Pat. No. 3,979,286.

BACKGROUND OF THE INVENTION

This invention relates to an insoluble crosslinked-starch-xanthate composition useful for removing heavy metal ions from aqueous solutions.

In U.S. Pat. No. 3,947,354, herein incorporated by reference, a method was disclosed for removing heavy metal ions from aqueous solutions by precipitating a water-insoluble complex formed from a water-soluble cationic polymer, a water-soluble starch-xanthate, and the heavy metal ions. It was also disclosed in the above-mentioned patent that water-soluble starch-xanthate alone would coprecipitate with the heavy metal ions, but this coprecipitation resulted in a very inefficient heavy metal ion removal which did not meet present-day discharge limits. Because of our previous experience with the use of starch-xanthate in the removal of heavy metal ions from aqueous solutions, we were surprised to discover that heavy metal ions could be effectively removed from aqueous solutions by compositions comprising crosslinked-starch-xanthate having a degree of crosslinking (DCL) such that the crosslinked-starch-xanthate exhibits a degree of swelling in water at 95° C. of from 65% to 450%.

The compositions used in this invention have all the objects and advantages disclosed in U.S. Pat. No. 3,947,354, supra.

SUMMARY OF THE INVENTION

Insoluble-starch-xanthates were prepared by xanthation of highly crosslinked-starches under various conditions. After isolation of the products by solvent dehydration, freeze drying, spray drying, or flash drying, their properties were determined. Products prepared using magnesium salt incorporation gave increased room temperature stability. These products were very effective in removing heavy metals from water.

DETAILED DESCRIPTION OF THE INVENTION

Figure 1:
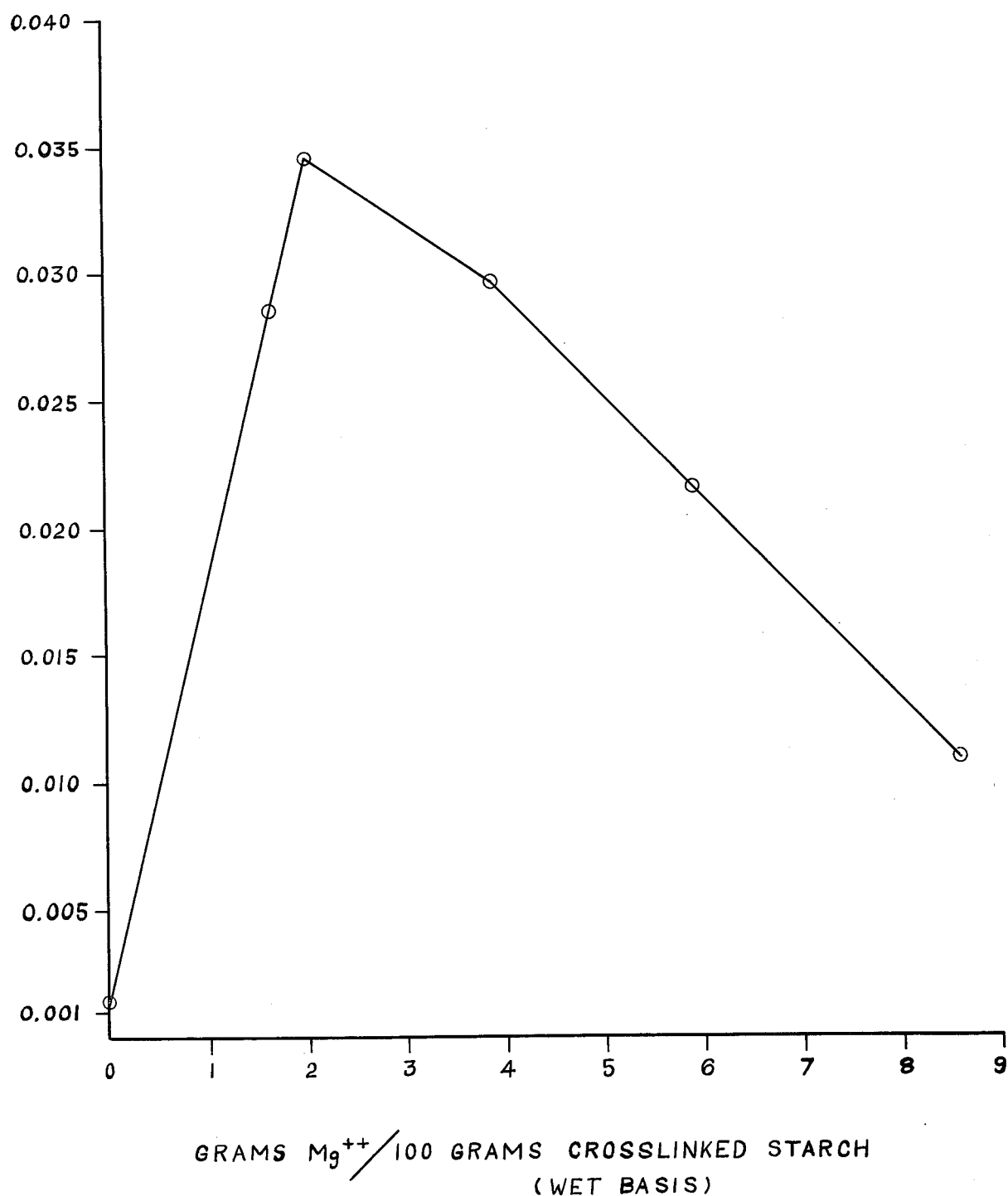

Crosslinked-starch-xanthate, that is, insoluble-starch-xanthate (ISX), is defined herein as starch which has been crosslinked with the various known crosslinking agents and which is subsequently xanthated. Xanthation is normally conducted in the presence of an alkali metal base such as sodium or potassium hydroxide. In the ensuing discussion, sodium hydroxide will be used for illustration purposes only, with the understanding that potassium hydroxide may be substituted as an equivalent thereto.

Crosslinked-starch starting materials, which are useful in accordance with the invention, include starches which have been crosslinked with epichlorohydrin, phosphorous oxychloride, sodium trimetaphosphate, anhydrides of dicarboxylic acids, acrolein, formaldehyde, glyoxal, and N-methylolureas (Encyclopedia of Polymer Science).

Starch crosslinked with epichlorohydrin and then xanthated in the presence of sodium hydroxide would have the following general structure:

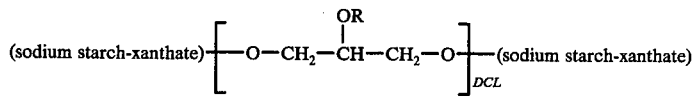

where R is —H or

starch crosslinked with phosphorous oxychloride or sodium trimetaphosphate and then xanthated in the presence of sodium hydroxide would have the following general structure:

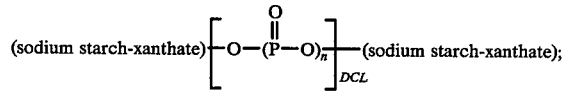

and starch crosslinked with formaldehyde and then xanthated in the presence of sodium hydroxide would have the following general structure:

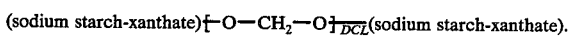

In the compositions represented by the structural formulas above, the crosslinking occurs solely between the respective starch molecules themselves. Specifically, the crosslink is between the hydroxyl oxygens which appear within the brackets.

The type and degree of crosslinking must be such that sufficient reactive sites are available for attachment of xanthate groups and that the ISX product is insoluble in water and all other solvents. It is the degree of crosslinking that determines the insolubility of the crosslinked-starch starting material and of the xanthated product.

Insolubility in crosslinked polymers is usually defined in terms of gelation and swelling. At the gel point nonlinear polymers (in this instance crosslinked-starches) change from viscous liquids to elastic gels which are characterized as being nonfusable and insoluble (Paul J. Florey, "Principles of Polymer Chemistry," Cornell University Press, Ithaca, New York, 1953, p. 47). According to Florey, one crosslink between two primary polymer molecules is sufficient to bring on gelation (Florey, supra, p. 358). Crosslinked-starches having one crosslink between two starch molecules would, therefore, be theoretically useful as starting materials in the preparation of ISX's. However, the degree of crosslinking in any polymer system is difficult to measure.

Florey (supra, pp. 581–583) shows that degree of crosslinking can be related to the degree of swelling that a network structure exhibits in a particular solvent system. As degree of crosslinking increases, degree of swelling decreases. Crosslinked-starches useful in accordance with the invention have a degree of crosslinking such that they exhibit a degree of swelling in water at 95° C. that ranges from 65% to 450% of the volume of unswollen crosslinked-starch. The ISX's exhibit essentially the same degree of swelling as the crosslinked-starches from which they are prepared. ISX's having degrees of swelling of less than 75% are preferred in that they are sufficiently insoluble to be easily filtered or centrifuged after being used to remove heavy metal ions from solutions. However, the most highly swellable ISX's, which would be difficult to filter, are useful in removing heavy metals from aqueous solutions, as long as they are adequately contacted with the heavy metal ions and recovered by some suitable means, such as centrifugation.

Operability of the ISX depends entirely on the number of xanthate groups attached to the composition in comparison to the number of heavy metal ions in solution. Theoretically, one xanthate group (xan) for every metal ion (M) would remove all metal ions. For the reasons given above for the inability to accurately determine degree of crosslinking, it is difficult to accurately determine the molecular weight of the ISX. However, assuming a degree of crosslinking of 10 anhydroglucose units/crosslink (AGU/cl), the molecular weight of ISX having a xanthate degree of substitution (D.S.) of 0.2 would be about 3% greater than the corresponding noncrosslinked-starch-xanthate. Since 10 AGU/cl constitutes a highly crosslinked-starch, it becomes obvious that an error in the actual degree of crosslinking at any level would be insignificant when calculating the amount of composition necessary to give a 1:1 ratio of xan:M. To obtain a 1:1 molar ratio of xan:M, one mmole of heavy metal ion would require 0.91 g. of a ISX having a xanthate D.S. of 0.2 and a 10 AGU/cl degree of crosslinking. Xanthate D.S. is not critical. Decreasing xanthate D.S. in ISX simply requires more composition to maintain the necessary xan:M ratio. The preferred ISX's have D.S.'s of from 0.1 to 1.0 and are effective in heavy metal ion removal.

Adding ISX to aqueous solutions increases pH. Since pollution regulations usually require the effluent discharged into streams to have pH's of from 6-9, it is preferable that the amount of ISX added to heavy metal containing industrial effluents be such that the final pH is within acceptable limits. This sometimes requires adding acid or base to the effluent.

Xanthation of starch is a well-known reaction (cf. "Starch: Chemistry and Technology," Whistler and Paschall, ed., Academic Press, New York and London, 1965, pp. 455-458) in which starch is contacted with carbon disulfide in a basic medium. In a number of tests, the reaction of crosslinked-starch and varying amounts of sodium hydroxide and carbon disulfide resulted in crosslinked products having varying xanthate D.S.'s, in the sodium salt form, but all were effective in heavy metal ion removal. Times of xanthation of 1, 4, and 16 hr. resulted in essentially the same products, all other parameters being the same. A 30-min. xanthation resulted in a slightly lower xanthate D.S. When solids concentration was increased from 10% to 25%, similar products were obtained.

Several work-up methods were evaluated including water washing on a filter followed by solvent drying; water washing with centrifugation, followed by solvent drying; water washing with centrifugation followed by freeze drying; water washing with filtration or centrifugation followed by flash drying; and water washing followed by spray drying. The only real difference with these washing treatments was the loss of base associated with the products when more water was used during centrifugation. This loss of base also accounts for the increase in percent sulfur of these products.

Since a considerable quantity of base remains in the filtrate and since large quantities of water would be required in large-scale production, the reuse of the mother liquor in subsequent xanthations was evaluated. Less base was used in each subsequent xanthation and from the product analysis a slightly less xanthated product was obtained. There was also a considerable decrease in the percent ash, which is an indirect measure of the base still associated with the product. Therefore, if the mother liquor is to be reused, sufficient base should be added to bring the base concentration up to that used in the initial xanthation.

Since a basic medium is used for both crosslinking and xanthation, an investigation was made of the preparation of ISX without isolation of the crosslinked intermediate. After the starch had been crosslinked, additional base and then carbon disulfide were added. The products obtained were essentially the same as those obtained in a separate two-step reaction and were effective in removing heavy metal ions from solutions.

Several approaches were investigated to prepare products which would have room temperature stability. Spray drying reduced the moisture content to 1-3% and such a product was more stable at room temperature. Vacuum oven drying at temperatures of 30°-50° C. for several hours yielded products with 7-10% moisture. These products showed decomposition when left at room temperature. Moreover, conversion of ISX into crosslinked-starch-xanthide with sodium nitrite did yield a product stable at room temperature. This product, however, was only effective in heavy metal ion removal when the ISX was regenerated by adjusting the pH to above 7.

ISX was tested periodically for apparent stability by evaluating its effectiveness to remove copper from solution. Since copper was effectively removed with the same amount of ISX stored at 0° or at room temperature with a moisture content of <3%, it was assumed there was little decomposition.

Conversion of the sodium ISX to either the calcium or magnesium form was accomplished by simply washing the product with the appropriate calcium or magnesium chloride salt. Calcium, magnesium, and sodium analyses of these products showed that this exchange procedure was 99% effective. The magnesium ISX had good room temperature stability for several months and was very effective in metal removal. The calcium ISX was more stable than the sodium form, but there was enough decomposition after several months of storage to render it ineffective in metal removal. It is effective when freshly made.

A more complete evaluation of the use of magnesium salts with ISX in preparations and product stability led to the use of magnesium sulfate directly in the xanthation mixture, as the most preferred embodiment.

A preliminary study was made under constant reaction conditions (crosslinked starch, 100 g.; sodium hydroxide, 45 g.; carbon disulfide, 15 ml.) to determine the optimum amount of magnesium ion required to give the most rapid dewatering rate. The time required for dewatering the product was used as the determining factor. FIG. 1 shows the inverse crack time required for the reaction slurry to be dewatered (product cake to crack) vs. the weight of magnesium ion used in the preparation which would yield a product containing around 5% sulfur. Analysis of the filtrate showed all the magnesium to be incorporated into the product.

ISX having a D.S. in the range of 0.1 to 1.0 would have sulfur contents of 3.72% to 24.57% and magnesium contents of about 0.5% to about 12%. The preferred ISX would have a D.S. range of 0.1 to 0.35, sulfur content of 3.72% to 10.84%, and a magnesium content of 0.5% to 9.2%.

Figure 2:
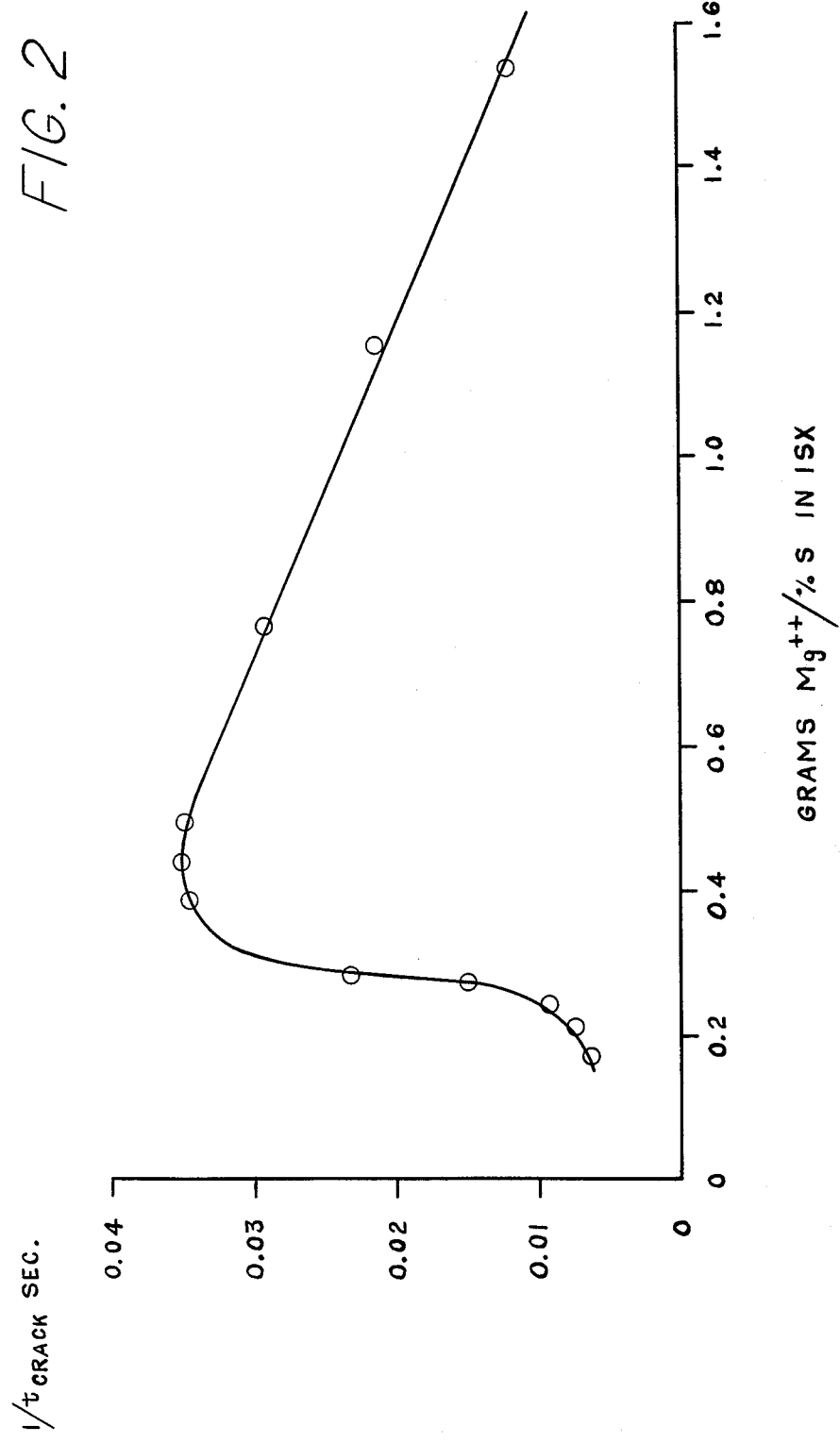

FIG. 2 shows an effective range of magnesium incorporation to be from about 0.2 to about 1.6 g. magnesium ion for each 1% sulfur desired in the product, with a preferred range of from 0.26 to 0.8. The optimum amount was determined to be about 0.4 g. magnesium ion for each 1% sulfur desired in the product. Products prepared using corresponding weights of any soluble magnesium salt gave similar products. Magnesium oxide, being only very slightly soluble, was ineffective. Physical mixtures of sodium ISX as a solid and various magnesium salts gave inefficient exchange to aid in product stability at room temperature.

Products containing magnesium ion in the effective amounts indicated above gave (a) increased filtration or centrifugation rates during work-up; (b) increased flash drying efficiency; (c) increased room temperature stability; and (d) increased settling rate in heavy metal cation removal.

The magnesium ion can be added (a) before the addition of the crosslinked starch; (b) during the 1-hr. xanthation; or (c) after the 1-hr. xanthation is completed. The continuous preparation of ISX would have the magnesium ion added before the addition of the crosslinked starch or metered in during the xanthation; however, the best results for batchwise xanthation would utilize additions of magnesium ion after xanthation. The resulting product in either case is a sodium-magnesium ISX having a Na/Mg ratio ranging from 0.5 to 10. Products having a Na/Mg ratio between 1-2 were optimum. The sodium and the magnesium may form salts with any available oxygen or xanthate in the crosslinked-starch-xanthate.

The magnesium ion treatment yields products after water washing which contain 20-25% solids and are crumbly for effective flash drying. The preparations which contained about 7% sulfur and 1-3% moisture appeared to have better room temperature stability over higher percent sulfur-containing products; however, the capacity for metal removal is reduced.

Optimum products for heavy metal removal appear to be the preparations using 15-30 ml. carbon disulfide with 10-20 g. magnesium sulfate. These products contain both a sodium xanthate and magnesium xanthate. For use in heavy metal removal the product should be added to the effluent (pH 3 or above) as a solid or slurry allowing the pH to rise to above pH 7 for optimum removal. The metal-xanthate sludge settles rapidly in the quiescent state in batch-type operations. For continuous flow effluent streams the aid of a clarifier, centrifuge or filter should be used. The sludge obtained from a centrifuge or filter is 50% solids which allows handling ease. After 3 hr. under ambient conditions, the solid dries to around 90% solids.

Stoichiometric quantities of ISX at a pH above 7 will in most cases reduce heavy metal concentrations to below established discharge limits. In some cases, less than stoichiometric quantities of ISX give excellent removal. Heavy metal removal is instantaneous; however, longer contact times are not detrimental to removal and in most cases increase removal. Salt (NaCl) concentrations of 0-10% have little influence on the effectiveness of the method.

The effluent after treatment contains only sodium and magnesium ions (Mg, 3-6 mg./l.) from the product. There is no detectable sulfur byproducts unless a decomposed ISX is used. The use of an ISX product which has decomposed slightly will sometimes turn the effluent pink-amber but at a pH above 8.5 these metal-bearing decomposition products precipitate leaving a clear effluent. If metal recovery is warranted, the metals can be released from the ISX by treatment with nitric acid to yield a concentrated solution of the metal ions. The sludge can also be incinerated to recover the metal oxides. In either treatment, the xanthate group is lost for further use. The nitric acid treatment does allow recovery of the crosslinked starch. If the sludge is landfilled, the metal is bound fairly strong and would have less chance to be leached out than a hydroxide sludge. The metal ions are so tightly bound to the ISX that normal eluting agents are ineffective in metal release.

The following examples are intended to further describe the invention and are not to be construed as limiting the scope of the invention which is defined by the claims.

EXAMPLES 1-13

Degrees of swelling were determined for several crosslinked-starches by the following method:

A. Apparatus
  Mechanical stirrer
  Stirring blade — triangular glass plate (¾ inch base X 4 inch height) twisted in a spiral connected to a drive shaft (glass rod 8 mm.) at the base of the triangle Centrifuge tube, 40 ml., graduated, Pyrex 8340 Pipette, 25 ml.
  Dishes, evaporating, Coors, approximately 3 inch diameter Optically clear test tube, 18 mm. X 180 mm. Glass rod with rubber tip B. Procedure Into a dried, tared centrifuge tube was placed 0.8000 g. dry basis of the crosslinked-starch or ISX to be tested and a sufficient amount of distilled water was added to bring the slurry to the 40 ml. mark. The weight of the tube and slurry was noted to the nearest 0.1 g.

The centrifuge tube was immersed in a water bath at 95° C. for 30 min. with stirring at 500 r.p.m. Stirrer should operate in the direction which imparts a downward thrust in the slurry.

After pasting for 30 min., the tube and stirrer were removed, cooled to room temperature, and sufficient distilled water was added to the tube to achieve the noted weight. It is recommended to add the water with a micropipette washing the stirrer as the water is being added. To dislodge particles on the stirrer, a rubber-tipped glass rod is helpful. The sample was stirred 5 min. at 400 r.p.m. with NO heat to disperse the added water evenly into the paste.

The tube was removed and the stirrer wiped off with the rubber-tipped glass rod to recover as much of the paste as possible. The tube was centrifuged for 15 min. at 2,500 r.p.m. The tube contained two layers--a supernatant and a sediment.

With the aid of the graduated marks, the volume of the sediment in the tube was determined.

The procedure was repeated with the exception that samples were maintained at 25° to prevent swelling.

The sediment volumes for the nonswelled samples were about 1.5 ml. Degree of swelling was calculated as follows and reported in Table 1:

$$\text{degree of swelling, \%} = \frac{\text{sediment vol. 95° C.} - \text{sediment vol. 25°}}{\text{sediment vol. 25°}} \times 100.$$

Table 1

| Crosslinked-starch | Crosslinking reagent | Volume, ml. | Degree of swelling, % |
|---|---|---|---|
| Std. (cold) | Epichlorohydrin | 1.5 | — |
| A | Epichlorohydrin | 2.5 | 67 |
| B | Phosphorous oxychloride | 2.5 | 67 |
| C | Epichlorohydrin | 2.6 | 73 |
| D | Epichlorohydrin | 3.6 | 140 |
| E | Epichlorohydrin | 6.1 | 306 |
| F | Epichlorohydrin | 9.2 | 446 |
| G | Epichlorohydrin | 2.9 | 93 |

Crosslinked-starches A through F above were obtained commercially. Product G was prepared as follows: 506 g. corn starch were slurried in 650 ml. water containing 7.5 g. of sodium chloride and 27.8 ml. of epichlorohydrin, and 30 g. KOH in 100 ml. water were added in 4-ml. portions every 10 min. The slurry was stirred for 20 hr., neutralized with HCl, filtered, washed successively with water, acetone and ether, and over dried. Degree of swelling was determined as above.

Crosslinked-starches A through F above were slurried with potassium or sodium hydroxide in an amount of water approximately equal to 10 times the amount of crosslinked-starch by weight, and the mixture was stirred for 30 min. at 25° C. Crosslinked-starch G above was treated in the same manner except that the amount of water was approximately equal to four times the amount of crosslinked-starch G, by weight. Carbon disulfide was then added, and the mixture was stirred for approximately 16 hr. at 25° C. The slurry was filtered, and the solid product was washed successively with water (75 ml.), several portions of acetone (500 ml. total), and ether (100 ml.), and dried in a vacuum oven at 25° C. for 2 hr. Weights and volumes of reactants and analysis of the final products are disclosed in Table 2.

Moisture analysis was run at 25° C. under vacuum for 2-3 hr. and is uncorrected for xanthate decomposition that may have occurred. Percent ash includes metal ion of xanthate and bound alkali in product.

EXAMPLES 14–18

Crosslinked-starch A was xanthated as described in Examples 1–12 with the exception that the time of xanthate was varied from 0.5 to 16 hr. Weights and volumes of reactants and analysis of the final products are disclosed in Table 3.

EXAMPLES 19–21

Crosslinked-starch A (35.4 g.) was xanthated as described in Example 3 (0.4 mole of NaOH and 0.08 mole of CS$_2$). Replicate ISX products were recovered by various means. In Example 19 the solid product was washed successively with water, acetone, and ether followed by vacuum oven drying as in Examples 1–13; Examples 20 was centrifuged four times with water (800 ml. total), then treated as in Example 19 above; and Example 21 was centrifuged four times with water (800 ml. total), then freeze dried in water. Analyses of the final products are disclosed in Table 4.

Table 2

| Example | Crosslinked-starch | Starch weight, g. | Base | Moles | Carbon disulfide, moles | Product weight, g. | D.S. | % Ash | % H$_2$O |
|---|---|---|---|---|---|---|---|---|---|
| 1 | A | 35.4 | NaOH | 0.2 | 0.08 | 43.0 | 0.15 | 15.7 | 12.2 |
| 2 | A | 35.4 | NaOH | 0.2 | 0.16 | 41.0 | 0.19 | 11.7 | 9.6 |
| 3 | A | 35.4 | NaOH | 0.4 | 0.08 | 48.4 | 0.18 | 22.1 | 15.6 |
| 4 | A | 35.4 | NaOH | 0.4 | 0.16 | 50.0 | 0.28 | 22.2 | 14.9 |
| 5 | A | 70.8 | NaOH | 0.8 | 0.16 | 95.6 | 0.16 | 19.9 | 16.3 |
| 6 | A | 35.4 | KOH | 0.2 | 0.08 | 41.4 | 0.14 | 12.6 | 6.1 |
| 7 | A | 35.4 | KOH | 0.4 | 0.16 | 48.1 | 0.31 | 15.9 | 9.8 |
| 8 | A | 10.0 | KOH | 0.8 | 0.40 | 16.0 | 0.60 | 30.3 | 8.6 |
| 9 | C | 35.4 | NaOH | 0.2 | 0.08 | 43.1 | 0.13 | — | — |
| 10 | C | 35.4 | KOH | 0.4 | 0.16 | 49.0 | 0.33 | 21.5 | 9.6 |
| 11 | F | 35.4 | KOH | 0.4 | 0.16 | 48.9 | 0.32 | 24.8 | 8.5 |
| 12 | B | 35.4 | KOH | 0.4 | 0.16 | 51.8 | 0.31 | 25.9 | 11.9 |
| 13 | G | 177.0 | NaOH | 1.0 | 0.40 | 225.0 | 0.24 | 14.9 | 15.1 |

Table 3

| Example | Xanthation time, hr. | Starch weight, g. | NaOH, moles | CS$_2$, moles | Product weight, g. | D.S. | % Ash | % H$_2$O |
|---|---|---|---|---|---|---|---|---|
| 14 | 0.5 | 35.4 | 0.4 | 0.08 | 42 | 0.14 | 11.4 | 13.0 |
| 15 | 0.5 | 35.4 | 0.4 | 0.08 | 3 | 0.19 | 19.1 | 14.3 |
| 16 | 1 | 100 | 1.1 | 0.24 | 133.5 | 0.18 | 13.4 | 19.1 |
| 17 | 4 | 35.4 | 0.4 | 0.08 | 48.4 | 0.18 | 16.7 | 14.3 |
| 18 | 16 | 35.4 | 0.4 | 0.08 | 48.4 | 0.18 | 22.1 | 15.6 |

Table 4

| Example | Product weight, g. | D.S. | % Ash | % H$_2$O |
|---|---|---|---|---|
| 19 | 53.0 | 0.15 | 34.3 | 18.5 |
| 20 | 42.8 | 0.18 | 12.8 | 8.6 |
| 21 | 42.0 | 0.25 | 9.2 | 6.6 |

EXAMPLE 22

Crosslinked-starch A (100 g.) was xanthated as described in Example 16 (1.1 moles NaOH and 0.24 mole CS$_2$). The mixture was filtered and washed with a small volume of water to give 400 ml. of mother liquor, which was saved for subsequent xanthation. The product was recovered as described in Examples 1–13 (Table 5).

EXAMPLE 23

Crosslinked-starch A (100 g.) was slurried in the mother liquor of Example 22 to which 0.6 mole of NaOH and 0.24 mole of $CS_2$ were added and stirred for 16 hr. at 25° C. The mother liquor and products were recovered as described in Example 22 (Table 5).

EXAMPLE 24

Crosslinked-starch A (100 g.) was xanthated in the mother liquor of Example 23 to which 0.3 mole of NaOH and 0.24 mole of $CS_2$ were added, and the mother liquor and xanthation products were recovered as described in Example 22 (Table 5).

EXAMPLE 25

Crosslinked-starch A (100 g.) was xanthated in the mother liquor of Example 24 to which 0.3 mole of NaOH and 0.24 mole of $CS_2$ were added, and the products were recovered as described in Example 22 (Table 5).

Table 5

| Example | Product weight, g. | D.S. | % Ash | % $H_2O$ |
|---|---|---|---|---|
| 22 | 128.3 | 0.17 | 16.6 | 13.1 |
| 23 | 127.5 | 0.11 | 14.0 | 14.1 |
| 24 | 119.3 | 0.12 | 9.1 | 11.3 |
| 25 | 119.2 | 0.12 | 8.8 | 11.2 |

EXAMPLE 26

A. Commercial corn starch (100 g., 10% $H_2O$) was slurried in water (150 ml.) containing sodium chloride (1.5 g.) and epichlorohydrin (7.0 ml.). To this slurry was added potassium hydroxide (6 g.) in water (40 ml.) slowly over 30 min. The slurry was warmed to 50° C. and then cooled to room temperature. Water (50 ml.) and epichlorohydrin (2 ml.) were added and the mixture was stirred for 16 hr. The suspension, now containing highly crosslinked-starch, was treated with sodium hydroxide (1.2 moles) in water (250 ml.). Carbon disulfide (0.24 mole) was added near the bottom of the beaker, and the mixture was stirred for 16 hr. The mixture was filtered and was washed with water (100 ml.), acetone (750 ml.), and ether (200 ml.). After drying for 2 hr. under vacuum, the product was analyzed. Yield: 132.2 g; D.S. 0.15; $H_2O$, 11.4%; ash, 14.3%.

B. The reaction was repeated on 506 g. starch but without the heating step, the additional water, and epichlorohydrin during crosslinking. Yield: 657 g.; D.S. 0.21; $H_2O$, 18.1%; ash, 19.5%.

EXAMPLE 27

Crosslinked-starch A (177 g.) was slurried in water (655 ml.) and sodium hydroxide (1.0 mole) in water (100 ml.) was added. Carbon disulfide (0.4 mole) was added below the liquid surface, and the mixture was stirred for 16 hr. The mixture was centrifuged and washed four times with water (1,600 ml. total) in centrifuge bottles. The product was suspended in water (500 ml.) to give a final volume of 1,000 ml. This suspension was stirred and pumped into a NIRO portable spray drier (Copenhagen, Denmark) at a rate of 3 l./hr. (spindle speed, 35,000 r.p.m.; inlet temperature, 260° C.; and outlet temperature, 118° C.). Yield: 190 g.; D.S. 0.25; $H_2O$, 3.0%; ash, 11.6%.

EXAMPLE 28

ISX was prepared as described in Example 13. Before filtration the reaction mixture was treated successively with glacial acetic acid (20 ml.), sodium nitrite (28.5 g./50 ml. water), and 6N HCl (250 ml.). The mixture was stirred for 30 min., and the final pH was 3.8. The resulting crosslinked-starch-xanthide was filtered, washed with water (400 ml.), acetone (750 ml.), and ether (400 ml.), and dried in a vacuum oven at room temperature for 5 hr. Yield: 110.8 g.; D.S. 0.10; $H_2O$, 6.7%; ash, 0.9%.

EXAMPLE 29

Sodium ISX was prepared as described in Example 13. After filtration the product was washed with water (200 ml.) and a solution (200 ml.) of calcium chloride (20 g.). Following the usual wash with acetone and ether, the ISX product was dried for 4 hr. in a vacuum oven. Yield: 127 g.; D.S. 0.14; $H_2O$, 11.9%; ash, 7.2%.

EXAMPLE 30

Example 29 was repeated with the exception that magnesium chloride hexahydrate (40 g.) was substituted for the calcium chloride. Yield: 134.5 g.; D.S. 0.13; $H_2O$, 13.3%, ash, 10.7%.

EXAMPLE 31

Crosslinked-starch A (Table 1) (100 g.) was slurried in water (435 ml.), and sodium hydroxide (45 g.) in water (125 ml.) was added. This mixture was stirred 30 min. Carbon disulfide (30 ml.) was added and the mixture was stirred 1 hr. in a covered beaker. Magnesium sulfate (19 g.) in water (250 ml.) was added and the mixture was allowed to stir an additional 5 min. The slurry was filtered through a Buchner funnel using Whatman No. 54 filter paper and the solid was washed with water (1,000 ml.). The solid (75% $H_2O$) was then washed with acetone and ether. After drying for 2 hr. under vacuum, the product was analyzed. Yield: 120 g.; S, 9.62%; $H_2O$, 8.92%; ash, 12.89%.

EXAMPLES 32–38

Crosslinked-starches A and D (Table 1) were xanthated as described in Example 31. Approximately 2 g. magnesium sulfate for each 1% S desired in the final product was used. The products were flash dried with a laboratory Benco Vertical Pneumatic Dryer. Percent sulfur was determined by the Schoniger procedure in most cases. Some interference was noted occasionally from the magnesium and, when this occurred, the percent sulfur was determined gravimetrically. Moisture analysis was run at 25° C. under vacuum for 2–3 hr. Percent ash includes sodium and magnesium of xanthate and bound alkali in product. Sodium and magnesium contents of the products were determined by treating a 0.25-g. sample with 1N nitric acid (45 ml.) to remove all the sodium and magnesium. The filtrates were diluted to 1 l. and the sodium and magnesium concentrations were determined on a Varian Techtron AA120 spectrophotometer. The capacities for the products were determined by the following formulas:

$$\% S = \frac{6400 \ D.S.}{162 - D.S. + 99.5 \ D.S.},$$

$$meq/g. = \frac{D.S. \ (1,000)}{162 + D.S. \ (99.5)},$$

$$\text{or} \quad \text{meq/g.} = \frac{\% S}{6.412}.$$

In Examples 37–38 the magnesium sulfate in water (180 ml.) was added 45 sec. after the carbon disulfide. Weights and volumes of reactants and analysis of the final products are disclosed in Table 6. The yellow-tan products were stored in a cool, dry place for maximum effectiveness.

EXAMPLE 39

Crosslinked-starch A (100 g.) was slurried in water (435 ml.) and potassium hydroxide (63 g.) in water (125 ml.) was added. This mixture was stirred 30 min. Carbon disulfide (30 ml.) was added and the mixture was stirred 1 hr. in a covered beaker. Magnesium sulfate (19 g.) in water (200 ml.) was added and the mixture was allowed to stir an additional 5 min. The slurry was filtered through a Buchner funnel using Whatman No. 54 filter paper and the solid was washed with water (1,000 ml.). The solid (80% water) was flash dried. Yield: 125 g.; S, 10.13%; $H_2O$, 5.92%; ash, 33.33%; K, 27.7 mg.; Mg, 7.74 mg.; K/Mg, 3.58; capacity = 1.56 meq/g.

EXAMPLE 42

Aqueous solutions of metal salts having various metal ion concentrations were prepared and treated as follows: amounts of ISX from Example 3 of from 0.04 to 0.07 g. were added to 50 ml. of each metal ion solution. The solution was stirred for 2 hr. at 25° C. and then filtered. Residual metal ion was determined for each filtrate using a Varian Techtron AA120 spectrophotometer. The resulting residual metal ion determinations were compared to State of Illinois discharge limits for public and food processing waters (Illinois Pollution Control Board, Newsletter No. 44, page 7, March 1972) (Table 7).

EXAMPLE 43

Examples 22 and 25 were used to treat a solution containing copper ion in the manner described in Example 42 (Table 8).

EXAMPLE 44

Example 3 was stored at 0° C. for 43 wk. Samples were periodically removed from storage and used to treat a solution containing 31,770 μg. [Cu]/l. as described in Example 42 (Table 9).

Table 6

| Example | Crosslinked-starch | Carbon disulfide, ml. | Magnesium sulfate, g. | % S d.b. | % $H_2O$ | % Ash | Na, mg. | Mg, mg. | Na/Mg | Metal ion capacity, meq/g. |
|---|---|---|---|---|---|---|---|---|---|---|
| 32 | A | 15 | 12.4 | 5.76 | 2.19 | 10.72 | 8.5 | 6.2 | 1.37 | 0.88 |
| 33 | A | 20 | 15 | 7.44 | 1.34 | 16.52 | 10.6 | 6.9 | 1.54 | 1.14 |
| 34 | A | 25 | 17 | 8.40 | 1.40 | 19.20 | 12.1 | 7.0 | 1.73 | 1.20 |
| 35 | A | 30 | 19 | 10.12 | 0.85 | 24.08 | 14.2 | 7.4 | 1.92 | 1.56 |
| 36 | A | 35 | 21.5 | 8.86 | 1.74 | 18.15 | 13.2 | 8.3 | 1.59 | 1.36 |
| 37 | A | 30 | 18 | 8.05 | 1.33 | 13.31 | 11.4 | 7.1 | 1.60 | 1.24 |
| 38 | D | 30 | 18 | 9.29 | 0.86 | 16.32 | 12.8 | 7.3 | 1.75 | 1.44 |

EXAMPLE 40

Commercial corn starch (100 g.; 10% $H_2O$) was slurried in water (150 ml.) containing sodium chloride (1.5 g.) and epichlorohydrin (7.0 ml.). To this slurry was added potassium hydroxide (6 g.) in water (40 ml.) slowly over 15 min. and the mixture was allowed to stir for 16 hr. The suspension, now containing highly crosslinked-starch, was diluted with water (245 ml.) and was treated with sodium hydroxide (45 g.) in water (125 ml.). After 30 min. carbon disulfide (15 ml.) was added and the mixture was stirred 1 hr. in a covered beaker. Magnesium sulfate (11 g.) in water (200 ml.) was added and the mixture was stirred an additional 5 min. The mixture was worked-up as in Example 31. Yield: 122 g.; S, 5.58%; $H_2O$, 6.17%; Ash, 10.94%; Na/Mg, 1.41.

EXAMPLE 41

Crosslinked-starch A (Table 1) (20 lb., d.b.) was slurried in water (80 lb.) and magnesium sulfate (3.61 lb.) was added. The slurry was pumped through a Baker Perkins Flowmaster Rotofeed (7½inches) at 890 g./min. and 28° C. The sodium hydroxide (4.66N, 24 l.) was metered in at 470 ml./min. and the carbon disulfide (3.32 l.) at 65 ml./min. The slurry was pumped through in 50 min. and after 30 min. in a holding tank, water (10 gal.) was added for easier feeding to the centrifuge. The mixture was centrifuged in a Tolhurst Centrifuge (26 inches–2,400 r.p.m.) at 650 r.p.m. and then washed with water (26.5 gal.). The cake was dewatered to 27% solids at 1,500 r.p.m. The cake was flash dried and gave the following analysis: S, 9.14%; ash, 14.06%; $H_2O$, 3.16%.

Table 9

| Product age, wk. | ISX weight, g. | Residual [Cu], μg./l. |
|---|---|---|
| 1 | 0.0544 | 14 |
| 1 | 0.0495 | 12 |
| 2 | 0.0522 | 12 |
| 10 | 0.0459 | 39 |
| 23 | 0.0491 | 25 |
| 43 | 0.0516 | 31 |

Table 7

| Metal | Initial concn., μg./l. | Initial pH | Final pH | Residual metal, μg./l. | Illinois discharge limit, μg./l. |
|---|---|---|---|---|---|
| $Cu^{+2}$ | 31,770 | 3.4 | 6.4 | 7 | 20 |
| $Ni^{+2}$ | 29,350 | 3.2 | 7.7 | 19 | 1,000 |
| $Cd^{+2}$ | 56,200 | 3.0 | 6.8 | 9 | 50 |
| $Pb^{+2}$ | 103,600 | 3.1 | 7.3 | 25 | 100 |
| $Cr^{+3}$ | 26,000 | 3.2 | 6.5 | 3 | 1,000 |
| $Ag^{+}$ | 53,940 | 3.1 | 7.2 | 245 | 5 |
| $Zn^{+2}$ | 32,690 | 3.1 | 7.5 | 46 | 1,000 |
| $Fe^{+2}$ | 27,920 | 3.0 | 6.4 | 0 | 1,000 |
| $Mn^{+2}$ | 27,470 | 3.3 | 9.0 | 1,628 | 1,000 |
| $Hg^{+2}$ | 100,000 | 3.1 | 4.2 | 3 | 0.5 |

Table 8

| Ex. | ISX Weight, g. | Initial [Cu], μg./l. | Initial pH | Final pH | Residual [Cu], μg./l. |
|---|---|---|---|---|---|
| 22 | 0.0554 | 31.770 | 3.0 | 8.7 | 11 |
| 25 | 0.0515 | 31,770 | 3.0 | 7.4 | 11 |

EXAMPLE 45

Example 26B was used to treat solutions containing various concentrations of copper ion. The treatment was the same as that described in Example 42, except that the mixture was stirred for 30 min. instead of 2 hr. (Table 10).

EXAMPLE 46

Nine industrial effluents containing a variety of heavy metal ions were treated in the same manner as described in Example 42. The ISX used was Example 26B, and the mixtures were stirred for 1 hr. (Table 11).

EXAMPLE 47

Solutions (1,000 ml.) containing the individual metals at the indicated concentrations were treated with the indicated amounts of ISX of Example 35 at pH 3.7. Solutions were stirred for 5–60 min. at a final pH of 8.9. After filtration, the residual metals were determined by a Varian Techtron AA120. The theoretical weight of ISX for a divalent metal is 0.64 g. The results are set forth in Table 12 below. Values listed with less than (<) were below detection limits.

EXAMPLE 48

A solution (1,000 ml.) containing a mixture of heavy metals of the indicated concentrations at pH 3.5 was treated with 0.32 g. of the product of Example 35 to a final pH of 8.9. After filtration the residual metals were determined by a Varian Techtron AA120. The results are set forth in Table 13 below. Values with less than (<) were below detection limits.

Table 10

| Initial [Cu], µg./l. | Initial pH | ISX weight, g. | Final pH | Residual [Cu], µg./l. |
|---|---|---|---|---|
| 320 | 4.8 | 0.0003 | 8.0 | 16 |
| 3,200 | 3.7 | 0.0099 | 8.5 | 159 |
| 32,000 | 3.9 | 0.0338 | 8.0 | 13 |
| 96,000 | 3.5 | 0.1021 | 8.6 | 16 |
| 320,000 | 3.0 | 0.3000 | 8.0 | 40 |

Table 12

| Metal | Initial concn., mg./l. | Example 35 ISX, g. | Residual concn., mg./l. | Illinois discharge limit, mg./l. |
|---|---|---|---|---|
| $Ag^+$ | 53.94 | 0.32 | 0.016 | 0.005 |
| $Au^{+3}$ | 30.00 | 0.50 | <0.010 | — |
| $Cd^{+2}$ | 56.20 | 0.64 | 0.012 | 0.050 |
| $Co^{+2}$ | 29.48 | 0.64 | 0.090 | — |
| $Cr^{+3}$ | 26.00 | 0.64 | 0.024 | 1.0 |
| $Cu^{+2}$ | 31.77 | 0.32 | 0.008 | 0.020 |
| $Fe^{+2}$ | 27.92 | 0.32 | 0.015 | 1.0 |
| $Hg^{+2}$ | 100.00 | 0.64 | 0.001 | 0.0005 |
| $Mn^{+2}$ | 27.47 | 0.64 | 0.015 | 1.0 |
| $Ni^{+2}$ | 29.35 | 0.64 | 0.160 | 1.0 |
| $Pb^{+2}$ | 103.60 | 0.64 | 0.035 | 0.100 |
| $Zn^{+2}$ | 32.69 | 0.32 | 0.294 | 1.0 |

Table 13

| Metal | Initial concn., mg./l. | Residual concn., mg./l. |
|---|---|---|
| $Cd^{+2}$ | 5.62 | 0.001 |
| $Co^{+2}$ | 2.95 | <0.010 |
| $Cr^{+3}$ | 2.60 | 0.026 |
| $Cu^{+2}$ | 3.18 | <0.005 |
| $Fe^{+2}$ | 2.79 | 0.001 |
| $Hg^{+2}$ | 10.00 | 0.0007 |
| $Mn^{+2}$ | 2.75 | 0.010 |
| $Ni^{+2}$ | 2.93 | <0.050 |
| $Pb^{+2}$ | 10.36 | <0.031 |
| $Zn^{+2}$ | 3.27 | 0.007 |

EXAMPLES 49–53

Aqueous solutions (25 gal.) of metal salts having various metal ion concentrations were prepared and treated as follows: Example 49 treated with ISX from Example 26B; Example 50 treated with 20% sodium hydroxide; Example 51 treated with 20% calcium hydroxide; Examples 52–53 treated with 205 sodium hydroxide and ISX from Example 26B. Samples were removed after a 15-min. stir for metal analysis. The results are set forth in Table 14 below.

Table 11

| Industrial effluent sample | | Initial pH | ISX weight, g. | Final pH | Metals, µg./l. | | | | | | | |
|---|---|---|---|---|---|---|---|---|---|---|---|---|
| | | | | | $Cd^{+2}$ | $Cr^{+3}$ | $Cu^{+2}$ | $Fe^{+2}$ | $Pb^{+2}$ | $Hg^{+2}$ | $Ni^{+2}$ | $Zn^{+2}$ |
| A | initial | 7.5 | — | — | | | | 34,640 | | | | |
| | treated | — | 0.0612 | 9.0 | | | | 120 | | | | |
| B | initial | 7.6 | — | — | | | | | | | 923,000 | |
| | treated | — | 0.9238 | 10.7 | | | | | | | 34 | |
| C | initial | 3.5 | — | — | | | | | | | | 4,836 |
| | treated | — | 0.0315 | 7.7 | | | | | | | | 16 |
| D | initial | 5.3 | — | — | 87 | 250,000 | 150 | 3,045 | 555 | | | |
| | treated | — | 0.1596 | 6.7 | 5 | 216 | 16 | 0 | 0 | | | |
| E | initial | 5.3 | — | — | 150 | 19,444 | 105 | | | | | |
| | treated | — | 0.0416 | 7.3 | 4 | — | 9 | | | | | |
| F | initial | 5.1 | — | — | 333 | 3,611 | 1,340 | 267 | | 6,640 | | |
| | | | | | | | 47,180 | | | | | |
| | treated | — | 0.2892 | 6.2 | 13 | 744 | 16 | 3,227 | 0 | | 55 | |
| G | initial | 4.4 | — | — | 147 | 2,833 | 105 | | | | | |
| | treated | — | 0.0302 | 7.0 | 0 | 222 | 0 | | | | | |
| H | initial | 3.1 | — | — | 833 | | 217 | | | | | |
| | treated | — | 0.0510 | 7.5 | 17 | | 0 | | | | | |
| I | initial | 4.5 | — | — | 4,197 | 20,000 | 141,000 | | | 13,111 | | |
| | treated | — | 0.2452 | 7.1 | 15 | 17 | 100 | | | 166 | | |

Table 14

| Ex. | Chemical added | Amount added | pH | Cd, µg./l. | Cr, µg./l. | Cu, µg./l. | Fe, µg./l. | Pb, µg./l. | Mn, µg./l. | Hg, µg./l. | Ni, µg./l. | Ag, µg./l. | Zn, µg./l. | COD, mg./l. |
|---|---|---|---|---|---|---|---|---|---|---|---|---|---|---|
| 49 | None | | 6.5 | 5,440 | 2,790 | 3,260 | 3,030 | 3,670 | 2,740 | 9,900 | 2,960 | 62 | 2,020 | |
| | ISX | 103 g. | 7.0 | 13 | 18 | 9 | 111 | 0 | 2,380 | 54 | 23 | 4 | 13 | 61 |

Table 14-continued

| Ex. | Chemical added | Amount added | pH | Cd, μg./l. | Cr, μg./l. | Cu, μg./l. | Fe, μg./l. | Pb, μg./l. | Mn, μg./l. | Hg, μg./l. | Ni, μg./l. | Ag, μg./l. | Zn, μg./l. | COD, mg./l. |
|---|---|---|---|---|---|---|---|---|---|---|---|---|---|---|
| 50 | None | | 2.3 | 5,260 | 2.930, 3,350 | 3,040 | 4,130 | 2,670 | 9.960 | 2.850 | 62 | 2.900 | | |
| | NaOH | 190 ml. | 6.5 | 5,260 | 1,150 | 1,520 | 47 | 1,740 | 2,630 | | 2,830 | 49 | 2.820 | |
| | NaOH | 2 ml. | 7.0 | 5,100 | 436 | 1,450 | 486 | 2,290 | 2,630 | | 2,810 | 56 | 2,590 | 128 |
| | NaOH | 10 ml. | 7.5 | 4,740 | 143 | 630 | 139 | 1,100 | 2,630 | | 2,790 | 68 | 1,700 | |
| | NaOH | 6.5 ml. | 8.0 | 3,610 | 36 | 108 | 14 | 46 | 2,420 | | 2.380 | 52 | 36 | 142 |
| | NaOH | 23.5 ml. | 9.0 | 1,130 | 53 | 76 | 72 | 183 | 1,579 | >100 | 790 | 47 | 56 | |
| 51 | None | | 6.7 | 4,740 | 1,040 | 1,110 | 1,110 | 2.940 | 2,780 | 9.800 | 2,920 | 36 | 2,510 | |
| | Ca(OH)₂ | | 6.5 | 4,690 | 36 | 985 | 50 | 1,650 | 2,420 | | 2,560 | 36 | 2,770 | |
| | Ca(OH)₂ | | 7.0 | 4,460 | 18 | 477 | 11 | 275 | 2,320 | | 2,460 | 16 | 2,200 | 82 |
| | Ca(OH)₂ | | 7.5 | 3,890 | 14 | 246 | 17 | 46 | 2,260 | | 2,310 | 31 | 1,370 | |
| | Ca(OH)₂ | | 8.0 | 3,140 | 14 | 68 | 17 | 46 | 2,100 | | 2,270 | 41 | 110 | 82 |
| | Ca(OH)₂ | | 9.0 | 330 | 14 | 10 | 17 | 23 | 990 | | 1,540 | 31 | 10 | |
| | Ca(OH)₂ | 200 ml. total | 10.0 | 9 | 14 | 10 | 17 | 23 | 0 | >100 | 23 | 21 | 10 | |
| 52 | None | | 6.5 | 5,050 | 7 | 765 | 28 | 826 | 2,840 | 9,900 | 3,000 | 47 | 2,310 | |
| | NaOH | 13 ml. | 7.0 | 4,720 | 125 | 237 | 150 | 826 | 2,840 | 9,900 | 2,710 | 36 | 1,920 | |
| | ISX | 16 g. | 7.5 | 3,530 | 0 | 88 | 14 | 183 | 2,740 | 150 | 2,100 | 16 | 1,100 | |
| | ISX | 24 g. | 8.0 | 19 | 0 | 26 | 17 | 46 | 2,630 | 92 | 115 | 2 | 51 | 34 |
| | ISX | 32 g. | 8.5 | 8 | 0 | 14 | 17 | 23 | 1,900 | 1.5 | 23 | 2 | 10 | |
| 53 | None | | 3.3 | 5.930 | 2.930 | 3.230 | 2.670 | 6.330 | 2.950 | 9.850 | 2,850 | 83 | 2,920 | |
| | NaOH | 19 ml. | 6.5 | 5,460 | 0 | 72 | 17 | 2,940 | 2,840 | | 2,770 | 62 | 2,350 | |
| | NaOH | 1 ml. | 7.0 | 5,300 | 0 | 14 | 17 | 692 | 2,740 | | 2,520 | 47 | 2,000 | |
| | ISX | 5.5 g. | 7.5 | 4,840 | 0 | 4 | 0 | 0 | 2,590 | 140 | 1,770 | 26 | 740 | |
| | ISX | 6.0 g. | 8.0 | 2,010 | 0 | 3 | 11 | 0 | 2,020 | 93 | 15 | 42 | 5 | 21 |
| | ISX | 11 g. | 8.5 | 6 | 0 | 0 | 17 | 0 | 0 | 29 | 6 | 0 | 5 | 23 |
| Theory added | | | | 5,620 | 2,600 | 3,180 | 2,790 | 10,360 | 2,750 | 10,000 | 2,940 | | 5,390 | 3,270 |
| Illinois discharge | limit | | | 50 | 1,000 | 20 | 1,000 | 100 | 1,000 | 0.5 | 1,000 | | 5 | 1,000 |

We claim:
1. A process of removing heavy metal ions from aqueous solution comprising:
 (1) contacting heavy metal ions in aqueous solutions with an amount of alkali metal-magnesium salt of crosslinked-starch-xanthate,
 wherein said salt has a degree of crosslinking (DCL) such that it exhibits a degree of swelling in water at 95° C. of from 65% to 450%,
 wherein said magnesium is present in an amount ranging from about 0.5% to about 12%,
 wherein said crosslinking occurs between the starch molecules of said salt through the hydroxyl oxygens of said molecules, and
 wherein said amount of salt in said contacting step is such that the molar ratio of the xanthate moiety to metal ions is about 1:1; and
 (2) removing said heavy metal ions from said aqueous solution.

2. A process as described in claim 1 wherein the alkali metal-magnesium salt of crosslinked-starch-xanthate has the following general structure:

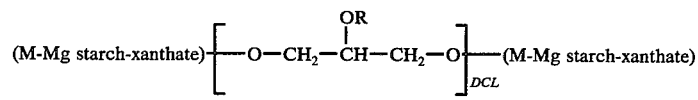

where

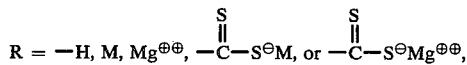

and $M = Na^\oplus$ or $K^\oplus$;

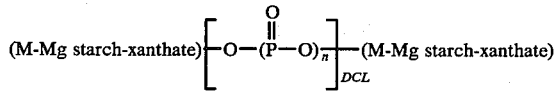

where $n = 1, 2,$ or $3$ and $M = Na^\oplus$ or $K^\oplus$; or

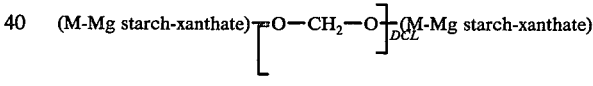

where $M = Na^\oplus$ or $K^\oplus$.

3. A process as described in claim 1 wherein said salt exhibits a degree of swelling of from 65% to 75%.

4. A process as described in claim 1 wherein said salt has a xanthate degree of substitution of from 0.1 to 1.

5. A process as described in claim 1 wherein said alkali metal is sodium.

6. A process as described in claim 1 wherein said alkali metal is potassium.